US011069168B2

(12) United States Patent
Stuntebeck

(10) Patent No.: US 11,069,168 B2
(45) Date of Patent: *Jul. 20, 2021

(54) FACIAL CAPTURE MANAGING ACCESS TO RESOURCES BY A DEVICE

(71) Applicant: AirWatch, LLC, Atlanta, GA (US)

(72) Inventor: Erich Stuntebeck, Marietta, GA (US)

(73) Assignee: AirWatch, LLC, Atlanta, GA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/524,351

(22) Filed: Jul. 29, 2019

(65) Prior Publication Data

US 2019/0394197 A1    Dec. 26, 2019

Related U.S. Application Data

(63) Continuation of application No. 15/181,812, filed on Jun. 14, 2016, now Pat. No. 10,412,081, which is a continuation of application No. 13/837,255, filed on Mar. 15, 2013, now Pat. No. 9,378,350.

(51) Int. Cl.
*G06K 9/00* (2006.01)
*G07C 9/25* (2020.01)
*G06F 21/32* (2013.01)
*H04L 29/06* (2006.01)
*H04N 7/18* (2006.01)
*H04W 12/08* (2021.01)

(52) U.S. Cl.
CPC ............. *G07C 9/257* (2020.01); *G06F 21/32* (2013.01); *G06K 9/00288* (2013.01); *H04L 63/0861* (2013.01); *H04N 7/188* (2013.01); *H04W 12/08* (2013.01)

(58) Field of Classification Search
CPC .... G06F 21/32; G06K 9/00288; G07C 9/257; H04N 7/188; H04W 12/08; H04L 63/0861

See application file for complete search history.

(56) References Cited

U.S. PATENT DOCUMENTS

| 5,229,764 | A | 7/1993 | Matchett |
| 6,023,708 | A | 2/2000 | Mendez |
| 6,085,192 | A | 7/2000 | Mendez |
| 6,131,096 | A | 10/2000 | Ng et al. |
| 6,131,116 | A | 10/2000 | Riggins et al. |
| 6,151,606 | A | 11/2000 | Mendez |
| 6,233,341 | B1 | 5/2001 | Riggins |
| 6,560,772 | B1 | 5/2003 | Slinger |
| 6,708,221 | B1 | 3/2004 | Mendez |
| 6,714,859 | B2 | 3/2004 | Jones |
| 6,726,106 | B1 | 4/2004 | Han |

(Continued)

*Primary Examiner* — Ian L Lemieux
(74) *Attorney, Agent, or Firm* — Clayton, McKay & Bailey, PC

(57) ABSTRACT

Disclosed are various embodiments for controlling access to resources by a client device. Methods may include receiving a user request to access a resource on the device and determining whether the resource requires a facial capture. If the resource requires a facial capture, a camera of the device may be automatically activated to capture an image and the resource may be rendered on the device. In some cases, access to the resource may be limited based on whether the image includes a face or not. A record associating the image and the requested resource may be stored, for example, on the device or on a remote server.

20 Claims, 2 Drawing Sheets

(56) References Cited

U.S. PATENT DOCUMENTS

| | | |
|---|---|---|
| 6,727,856 B1 | 4/2004 | Hill |
| 6,741,232 B1 | 5/2004 | Siedlikowski |
| 6,741,927 B2 | 5/2004 | Jones |
| 6,757,828 B1 | 6/2004 | Jaffe |
| 6,761,308 B1 | 7/2004 | Hanna |
| 6,766,454 B1 | 7/2004 | Riggins |
| 6,779,118 B1 | 8/2004 | Ikudome |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez |
| 7,064,688 B2 | 6/2006 | Collins |
| 7,088,220 B2 | 8/2006 | Kotzin |
| 7,092,943 B2 | 8/2006 | Roese |
| 7,184,801 B2 | 2/2007 | Farcasiu |
| 7,191,058 B2 | 3/2007 | Laird |
| 7,203,959 B2 | 4/2007 | Nachenberg |
| 7,225,231 B2 | 5/2007 | Mendez |
| 7,228,383 B2 | 6/2007 | Friedman |
| 7,245,218 B2 | 7/2007 | Ikehara |
| 7,275,073 B2 | 9/2007 | Ganji |
| 7,284,045 B1 | 10/2007 | Marl |
| 7,287,271 B1 | 10/2007 | Riggins |
| 7,308,703 B2 | 12/2007 | Wright |
| 7,310,535 B1 | 12/2007 | MacKenzie |
| 7,353,533 B2 | 4/2008 | Wright |
| 7,363,349 B2 | 4/2008 | Friedman |
| 7,363,361 B2 | 4/2008 | Tewari |
| 7,373,517 B1 | 5/2008 | Riggins |
| 7,437,752 B2 | 10/2008 | Heard |
| 7,444,375 B2 | 10/2008 | McConnell |
| 7,447,506 B1 | 11/2008 | MacKenzie |
| 7,447,799 B2 | 11/2008 | Kushner |
| 7,475,152 B2 | 1/2009 | Chan |
| 7,539,665 B2 | 5/2009 | Mendez |
| 7,565,314 B2 | 7/2009 | Borgeson |
| 7,590,403 B1 | 9/2009 | House |
| 7,594,224 B2 | 9/2009 | Patrick |
| 7,603,547 B2 | 10/2009 | Patrick |
| 7,603,548 B2 | 10/2009 | Patrick |
| 7,603,703 B2 | 10/2009 | Craft |
| 7,617,222 B2 | 11/2009 | Coulthard |
| 7,620,001 B2 | 11/2009 | Ganji |
| 7,620,392 B1 | 11/2009 | Maurya |
| 7,650,491 B2 | 1/2010 | Craft |
| 7,660,902 B2 | 2/2010 | Graham |
| 7,665,118 B2 | 2/2010 | Mann |
| 7,665,125 B2 | 2/2010 | Heard |
| 7,685,645 B2 | 3/2010 | Doyle |
| 7,702,322 B1 | 4/2010 | Maurya |
| 7,702,785 B2 | 4/2010 | Bruton |
| 7,735,112 B2 | 6/2010 | Kim |
| 7,735,122 B1 | 6/2010 | Johnson |
| 7,739,334 B1 | 6/2010 | Ng |
| 7,752,166 B2 | 7/2010 | Quinlan |
| 7,788,382 B1 | 8/2010 | Jones |
| 7,792,297 B1 | 9/2010 | Piccionelli |
| 7,840,631 B2 | 11/2010 | Farcasiu |
| 7,890,091 B2 | 2/2011 | Puskoor |
| 7,912,896 B2 | 3/2011 | Wolovitz |
| 7,917,641 B2 | 3/2011 | Crampton |
| 7,970,386 B2 | 6/2011 | Bhat |
| 8,001,082 B1 | 8/2011 | Muratov |
| 8,012,219 B2 | 9/2011 | Mendez |
| 8,041,776 B2 | 10/2011 | Friedman |
| 8,046,823 B1 | 10/2011 | Begen |
| 8,060,074 B2 | 11/2011 | Danford |
| 8,069,144 B2 | 11/2011 | Quinlan |
| 8,078,157 B2 | 12/2011 | Maurya |
| 8,094,591 B1 | 1/2012 | Hunter |
| 8,117,344 B2 | 2/2012 | Mendez |
| 8,150,431 B2 | 4/2012 | Wolovitz |
| 8,261,090 B1 | 9/2012 | Matsuoka |
| 9,392,460 B1 | 7/2016 | Blake |
| 2002/0013721 A1 | 1/2002 | Dabbiere |
| 2003/0110084 A1 | 6/2003 | Eberhard |
| 2003/0115475 A1 | 6/2003 | Russo |
| 2003/0204716 A1 | 10/2003 | Rockwood |
| 2004/0123153 A1 | 6/2004 | Wright |
| 2004/0181687 A1 | 9/2004 | Nachenberg |
| 2004/0224703 A1 | 11/2004 | Takaki |
| 2005/0246192 A1 | 11/2005 | Jauffred |
| 2006/0190984 A1 | 8/2006 | Heard |
| 2007/0009139 A1 | 1/2007 | Landschaft |
| 2007/0033397 A1 | 2/2007 | Phillips, II |
| 2007/0136492 A1 | 6/2007 | Blum |
| 2007/0156897 A1 | 7/2007 | Lim |
| 2007/0174433 A1 | 7/2007 | Mendez |
| 2007/0288637 A1 | 12/2007 | Layton |
| 2008/0133712 A1 | 6/2008 | Friedman |
| 2008/0134305 A1 | 6/2008 | Hinton |
| 2008/0201453 A1 | 8/2008 | Assenmacher |
| 2009/0036111 A1 | 2/2009 | Danford |
| 2009/0144632 A1 | 6/2009 | Mendez |
| 2009/0198997 A1 | 8/2009 | Yeap |
| 2009/0260064 A1 | 10/2009 | McDowell |
| 2009/0300739 A1 | 12/2009 | Nice |
| 2009/0307362 A1 | 12/2009 | Mendez |
| 2010/0005125 A1 | 1/2010 | Mendez |
| 2010/0005157 A1 | 1/2010 | Mendez |
| 2010/0005195 A1 | 1/2010 | Mendez |
| 2010/0023630 A1 | 1/2010 | Mendez |
| 2010/0100641 A1 | 4/2010 | Quinlan |
| 2010/0120450 A1 | 5/2010 | Herz |
| 2010/0144323 A1 | 6/2010 | Collins |
| 2010/0146269 A1 | 6/2010 | Baskaran |
| 2010/0216429 A1 | 8/2010 | Mahajan |
| 2010/0254410 A1 | 10/2010 | Collins |
| 2010/0268844 A1 | 10/2010 | Quinlan |
| 2010/0273456 A1 | 10/2010 | Wolovitz |
| 2010/0299152 A1 | 11/2010 | Batchu |
| 2010/0299362 A1 | 11/2010 | Osmond |
| 2010/0299376 A1 | 11/2010 | Batchu |
| 2010/0299719 A1 | 11/2010 | Burks |
| 2011/0004941 A1 | 1/2011 | Mendez |
| 2011/0016467 A1 | 1/2011 | Kane |
| 2011/0082900 A1 | 4/2011 | Nagpal |
| 2011/0113062 A1 | 5/2011 | Quinlan |
| 2011/0138176 A1 | 6/2011 | Mansour |
| 2011/0145932 A1 | 6/2011 | Nerger |
| 2011/0153779 A1 | 6/2011 | Mendez |
| 2011/0153799 A1 | 6/2011 | Ito |
| 2011/0167474 A1 | 7/2011 | Sinha |
| 2011/0170747 A1 | 7/2011 | Cohen |
| 2011/0202589 A1 | 8/2011 | Piernot |
| 2011/0225252 A1 | 9/2011 | Bhat |
| 2011/0270799 A1 | 11/2011 | Muratov |
| 2011/0276805 A1 | 11/2011 | Nagpal |
| 2011/0296186 A1 | 12/2011 | Wong |
| 2011/0320552 A1 | 12/2011 | Fiedman |
| 2012/0005578 A1 | 1/2012 | Hawkins |
| 2012/0015644 A1 | 1/2012 | Danford |
| 2012/0081282 A1 | 4/2012 | Chin |
| 2012/0102392 A1 | 4/2012 | Reesman |
| 2012/0198547 A1 | 8/2012 | Fredette |
| 2012/0204225 A1 | 8/2012 | Cohen |
| 2012/0216260 A1 | 8/2012 | Crawford |
| 2012/0235790 A1 | 9/2012 | Zhao |
| 2012/0284779 A1 | 11/2012 | Ingrassia |
| 2012/0311722 A1 | 12/2012 | Wang |
| 2013/0015946 A1 | 1/2013 | Lau |
| 2013/0051632 A1 | 2/2013 | Tsai |
| 2013/0148850 A1 | 6/2013 | Matsuda |
| 2013/0152169 A1 | 6/2013 | Stuntebeck |
| 2013/0197941 A1 | 8/2013 | Chochran |
| 2016/0242024 A1* | 8/2016 | Karren ............... H04W 4/60 |
| 2019/0147151 A1* | 5/2019 | Scopis ............ H04L 63/0861 382/118 |
| 2019/0327227 A1* | 10/2019 | Tobkes ............... H04W 12/06 |
| 2019/0373468 A1* | 12/2019 | Amisano ............ G08C 17/02 |

* cited by examiner

FACIAL CAPTURE MANAGING ACCESS TO RESOURCES BY A DEVICE

This application claims priority as a continuation of U.S. patent application Ser. No. 15/181,812, filed Jun. 14, 2016, which claims priority as a continuation of U.S. patent application Ser. No. 13/837,255, filed Mar. 15, 2013, both of which are expressly incorporated herein in their entireties.

BACKGROUND

Controlling access to and distribution of resources, such as documents, databases, and executable applications, in a networked environment is critical to ensure that only authorized users and network-connected devices may gain access to sensitive information. Depending on the sensitivity of a given resource, an array of authorization rues may be necessary to ensure that the resource is adequately protected. Some resources may only require ensuring that the proper user is requesting the resource. Other resources may require compliance with more stringent authorization rules, such as determining whether an appropriate transport protocol is used (i.e., http and/or https) by the requesting device, determining whether access to the resource is permitted for a specified duration or at a given time, determining whether the resource is accessed from a secured device, etc.

Some prior resource management systems may grant access to enterprise resources based in part on user access credentials, such as usernames and passwords. Additional security may be provided by requiring that authorized usernames and passwords be submitted using specific client devices (e.g., identified by approved device identifiers) and/or that such client devices comply with certain configuration requirements or other rules associated with the enterprise resources to be accessed. However, there may also be a need, particularly with respect to certain sensitive resources, to produce an even more comprehensive record of who the actual person was that accessed the resource. Accordingly, the inventors have proposed the following systems and methods to provide, at least in some aspects, methods of storing images, such as facial capture images, in association with resource access records.

SUMMARY OF THE INVENTION

The following systems and methods provide solutions for documenting the access and rendering of resources by client devices, including forcing image capture by the client device as part of accessing and rendering certain resources, Among other things, the present subject matter may provide the ability to store a record that includes an image, such as a facial capture, along with an identifier of the accessed resource. Such a record may be stored on the device and/or on a remote server. The record may include, for example, a time and date that the resource was accessed, information that indicates a version of the resource, a copy of the resource, a copy of the image, links to the resource and/or image, hashes of the resource and/or image, etc.

According to certain embodiments, methods of managing access to resources by a device may include one or more steps of receiving a user request to access a resource, and in response to the request to access the resource, activating a camera of the device to capture an image. The activating of the camera may be based on a determination that at least one of the resource, or an application attempting to access the resource, requires a facial capture record. The resource may include, for example, one or more of an application, a computer folder, a data file, an electronic document, a profile, etc. In some embodiments, a determination may be made as to whether the image includes a user's face. If the image includes a face, then access to the resource may be allowed. If the image does not include a face, the request to access the resource may be refused. A failure notification may be sent from the device to a remote server if the image does not include a face, or if the resource access request fails for any other reason. In response, the server may initiate a remedial action, such as sending a message to the user of the device (e.g., a text message) indicating that the resource access has failed and/or a reason for the access failure, wiping data from the device, locking the device, etc.

In some embodiments, the request to access the resource may include at least one of a request to open an application on the device, a request to access or render data stored on the device, a request to open an enterprise application residing at least partially on a network, and/or a request to access or render data that is stored at least partially on a network. When the resource is located, partially or completely, on a remote server, the device may send a request to access the resource to the remote server. The request to the remote server may be based on whether the image includes a face. In some embodiments, the device may also send the remote server a copy of the image associated with the resource request.

As will be appreciated from the foregoing, various embodiments may include, for example, the requested resource and the image being stored on the device, the requested resource being stored on a remote server and the image being stored on the device, the requested resource being stored on the device and a copy of the image being stored on a remote server, and the requested resource and a copy of the image being stored on the server.

In some embodiments, a copy of the image, a copy of the resource and/or the record associating the image and the resource may be saved with a certificate. The certificate may be configured to authenticate, for example, one or more of the image having been captured by the specific device, the image having been captured at a certain time and date, the resource having been rendered by the specific device, and/or the resource having been rendered at a certain time and date.

According to some embodiments, methods of managing access to resources by a device may include one or more steps of receiving a user request to access a resource, determining whether the resource requires a facial capture, and activating a camera of the device to capture an image based on whether the resource requires a facial capture. In some embodiments, the resource may be rendered on the device substantially contemporaneously with, or after, the image capture. In some embodiments, a record associating the image and the requested resource may be stored on the device and/or on a remote server.

According to some embodiments, methods of managing access to resources on a server may include one or more steps of receiving a user request from a client device to access a server resource, determining whether the user request is valid, providing the server resource to the client device, and receiving an image associated with the request from the client device. In some embodiments, a record may be stored on the server associating the image and the resource provided to the client device. In some embodiments, the server may send the client device an indication that the requested resource requires a facial capture record. This may be included, for example, in a file including the resource, or as a separate communication to the client device, such as a distribution rule.

According to certain embodiments, the various method steps and apparatus functions described herein may be embodied on non-transitory electronic storage medium in the form of computer-readable instructions that, when executed by a microprocessor, cause a computer system perform the described functions and steps.

Additional features, advantages, and embodiments may be set forth or apparent from consideration of the following detailed description, drawings, and claims. Moreover, it is to be understood that both the foregoing summary and the following detailed description are provided by way of example only and intended to provide further explanation without limiting the scope of the claimed subject matter.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
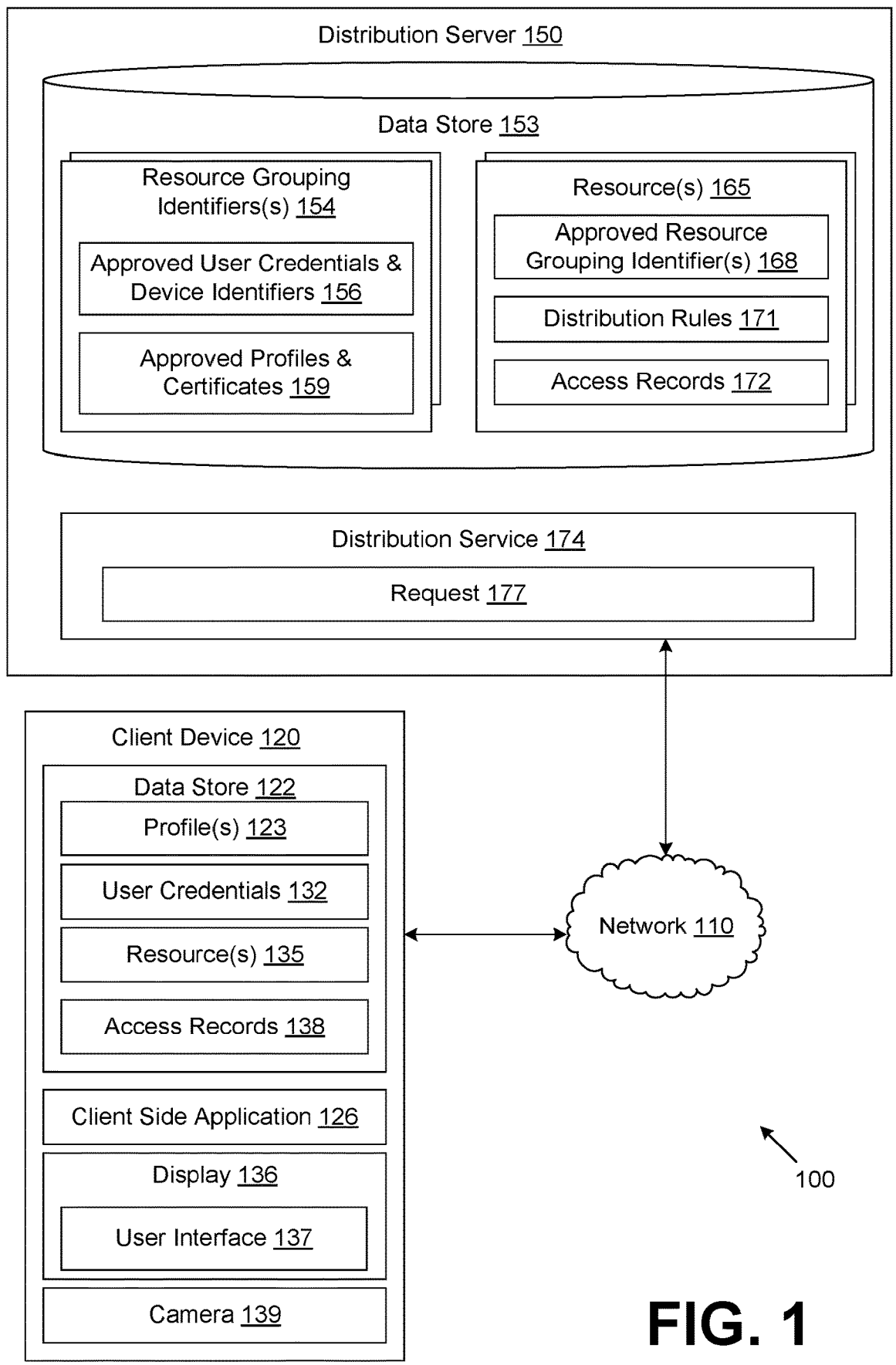
FIG. 1 is a block diagram of a networked environment according to certain embodiments consistent with the present disclosure.

It is to be understood that the subject matter disclosed and claimed herein Is not limited to the particular methodology, protocols, etc. described herein, as the skilled artisan will recognize that these may vary in different embodiments. It is also to be understood that the terminology used herein is used for the purpose of describing particular embodiments only, and is not intended to limit the scope of the subject matter disclosed and claimed herein. It also is to be noted that as used herein and in the appended claims, the singular forms "a" and "the" include the plural reference unless the context clearly dictates otherwise. Thus, for example, a reference to "an image" is a reference to one or more images and equivalents thereof known to those skilled in the art.

The embodiments disclosed herein and the various features and advantageous details thereof are explained more fully with reference to the non-limiting embodiments and examples that are described and/or illustrated in the accompanying drawings and detailed in the following description. Descriptions of well-known components and computing techniques may be omitted so as to not unnecessarily obscure the described embodiments. The examples used herein are intended merely to facilitate an understanding of ways in which the subject matter disclosed and claimed herein may be practiced and to further enable those of skill in the art to practice various embodiments.

Disclosed are various embodiments for a system and associated devices and methods for controlling access to resources such as computer applications and electronic data. In some embodiments, a device automatically captures an image in coordination with accessing, or attempting to access, certain resources. As described further herein, the captured image may be used in various ways including, for example, as a prerequisite for accessing the resource, as a record that a particular person accessed a given resource at a particular time and date, as an access check for future rendering on a locally stored resource, etc.

As described further herein, the captured image may be analyzed in various ways, and at different levels of technical sophistication. For example, the captured image may be analyzed to determine whether the image includes a face, or may be compared to another image to determine whether the images include the same face. With respect to determining whether the image includes a face, examples of this type of technology can be found, for example, in modern digital cameras, which often incorporate a facial detection system that allows the camera to focus and measure exposure on the face of the subject. Similar techniques, as well as more advanced facial recognition methods, may be used herein to determine if an image includes a face.

The invention may also use a facial recognition system, which is generally understood as a computer application for automatically identifying and/or verifying a person from a digital image or video frame. Such systems typically use algorithms that extract features, or landmarks, from an image, and determine correspondence with a feature threshold and/or compare selected features with one or more reference images. An algorithm may analyze, for example, the relative position, size, and/or shape of the eyes, nose, cheekbones, and jaw. The level of consistency required for determining whether an image includes a face, or whether the face matches the face from another image, can be set according to the requirements of the system and the level of confidence needed, e.g. from a relatively low level to a level of near certainty.

Popular recognition algorithms include Principal Component Analysis using Eigenfaces, Linear Discriminate Analysis, Elastic Bunch Graph Matching using the Fisherface algorithm, the Hidden Markov model, the Multilinear Subspace Learning using tensor representation, and the neuronal motivated dynamic link matching. Systems using 3-D facial recognition are also contemplated in some embodiments, and may find further applicability as more and more user devices are provided with the ability to capture, or otherwise produce, 3-D images.

FIG. 1 illustrates a networked environment 100 according to various embodiments. The networked environment 100 includes a network 110, a client device 120, and a distribution server 150. The network 110 may be or include, for example, any type of wireless network such as a wireless local area network (WLAN), a wireless wide area network (WWAN), or any other type of wireless network now known or later developed. Additionally, the network 110 may be or include the Internet, intranets, extranets, microwave networks, satellite communications, cellular systems, PCS, infrared communications, global area networks, or other suitable networks, etc., or any combination of two or more such networks. In some embodiments, the network 110 facilitates transmission of resources 165 between one or more client devices 120 and a distribution server 150.

The distribution server 150 may comprise, for example, a server computer or any other system providing distribution capability. For purposes of convenience, the distribution server 150 is referred to herein in the singular. Even though the distribution server 150 is referred to in the singular, it is understood that a plurality of distribution servers 150 may be employed in the arrangements as descried herein. The components executed on the distribution server 150, for example, include the distribution service 174 and other applications, services, processes, systems, engines, or functionality not disclosed in detail herein. The distribution service 174 may be executed to provide resources 165 stored in a data store 153 to a requesting client device 120 based on, for example, resource grouping identifiers 154 and distribution rules 171, as will be described.

The client device 120 may be a desktop computer, a laptop computer, a personal digital assistant, a cellular telephone, a set-top box, a music player, a web pad, a tablet computer system, a game console, and/or another device with like capability. The client device 120 may include a two-way communication component, such as a wired network connectivity component, an Ethernet network adapter, a modem, and/or the like, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 may thus be operable to communicate via wired connection with the distribution server 150 with the aid of the wired network connectivity component. The client device 120 may be further operable to communicate wirelessly with the distribution server 150 with the aid of the wireless network connectivity component. Additionally, the client device 120 may further comprise a camera 139 for capturing still images and/or videos, a memory for storing data and applications, a processor for executing applications stored in memory, and a local interface such as a bus.

The client device 120 may store, in a data store 122, a profile 123, user credentials 132, resources 135, and other data. Resources 135 may include any electronic data, such as databases, applications, text files, word processor files, spreadsheet files, presentation files, graphic files, audio files, photographic files, video files, applications and application files, and/or the like. More specifically, resources 135 may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

As noted, the distribution server 150 also includes a data store 153, which may include may include resources 165, as well as resource grouping identifiers 154, and/or other data. In some embodiments, the resources 165 referenced herein may include any electronic data, such as databases, applications, text files, word processor files, spreadsheet files, presentation files, graphic files, audio files, photographic files, video files, applications and application files, and/or the like. More specifically, resources 165 may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files. In some cases, the resources 135 stored on the client device may be copies or instances of resources 165 stored on the server 150

In certain embodiments, the data store 122 of the client device 120 may also include access records 138 that may include records, or logs, including information about certain resources 135 and/or resources 165 being, or having been, accessed by the client device 120. The data store 153 of the distribution server 150 may also include access records 172 reflecting the same or similar information.

Access records 138 or 172 may include information that associates an accessed resource, e.g. from among the resource records 135 or resources 165, and a captured image, as described further herein. The records, or logs, that associate an accessed resource and a captured image may take various forms and may include different levels of detail. For example, the record may include one or more of a copy of the accessed resource, a copy of the captured image, a certificate confirming the accuracy and/or access time and date of the resource copy, a certificate confirming the accuracy and/or capture time of the image copy, a hash identifier of the resource and/or image, etc. It should be understood that a "copy" of an image or resource need not be an exact reproduction of the original and may include, for example, lower resolution versions, compressed versions, hash functions or other representations sufficient to identify the original image or resource from the "copy" or to perform such other functions as may be required.

The client device 120 may be configured to execute various applications. For example, the client device 120 may be configured to execute applications such as web browsing applications, email applications, instant messaging applications, and/or other applications capable of receiving and/or rendering resources 135 or 165 on a display 136 associated with the client device 120. Any applications capable of receiving and/or rendering resources on a display 136 is generally referred to herein as a "client side application" 126, even though some, or all, of the application program itself may reside on non-transitory storage medium of any device or server networked to the client device 120.

In some embodiments, a client side application 126 may further include instructions that recognize when a given resource requires an image capture to allow access to the resource, and that initiate an image capture by the camera 139. The client side application 126 may be configured to recognize that a given resource requires an image capture, for example, based on an identifier of the resource, a resource group identifier 154, or specific instructions provided in association with the resource, such as a distribution rule 171. In some embodiments, the client side application 126 may be configured to require an image capture for any use of the application 126. In such situations, the distribution service 174 (described below) may be configured to make selected resources available only to the application 126 that always requires image capture, thereby ensuring that the image capture rue is applied whenever such resources are accessed. Client side application 126 may include various levels of execution code. For example, a set of instructions may be included in the client side application 126 that are executed when the application is called. This set of instructions may include a routine for initiating an image capture via camera 139 and/or for identifying if a called resource requires an image capture.

Rules related to an application and image capture requirements may also be included in a profile 123, and, may be set by a service provider that provides the client side application 126, or that provides additional code for the client side application 126 to perform the image capture function and associated record storage. Profile 123 may also include a certificate, which may represent either, or both, of an algorithm for generating a unique certificate and/or the generated certificate itself. For example, in certain operating systems, the system may recognize that a profile 123 includes a root or intermediate certificate, and automatically store the certificate in a trust store, or certificate store.

The certificate may be used to sign any images, or other resources, as discussed herein, and may, for example, uniquely associate the signed resource with the client device 120 or application 126. For example, a digital signature based on the certificate may be further based on one or more of a unique hardware identifier such as a QUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers.

The user credentials 132 may uniquely identify the user of the client device 120. For example, the user credentials 132 may include a username, a password, and/or biometric data related to facial recognition, retina recognition, fingerprint recognition, and the like. User credentials 132 may be input by a user via any suitable client side application and may be stored in the data store 122 of the client device 120. Accordingly, user credentials 132 may be retrieved from the data store 122 or may be input by a user in connection with a request for access to a resource 135, 165.

In some embodiments, access controls and image capture may be performed on the client device 120. For example, a client side application 126 may be configured to access locally stored resources 135. If a user attempts to open a resource 135 that requires an image capture, the client side application 126 may initiate the necessary steps on client device 120. Likewise, if a client side application 126 is configured to require image capture for all use of the application, it may initiate the necessary steps on client device 120 whenever the application is called. In some embodiments, client side application 126 may also be configured to access remotely stored resources, such as resources 165. If a user attempts to access a resource 165 that requires an image capture or other validation, the distribution service 174 may provide information sufficient for client side application 126 to initiate the necessary steps. One example that may include such features is described with reference to FIG. 2.

Figure 2:
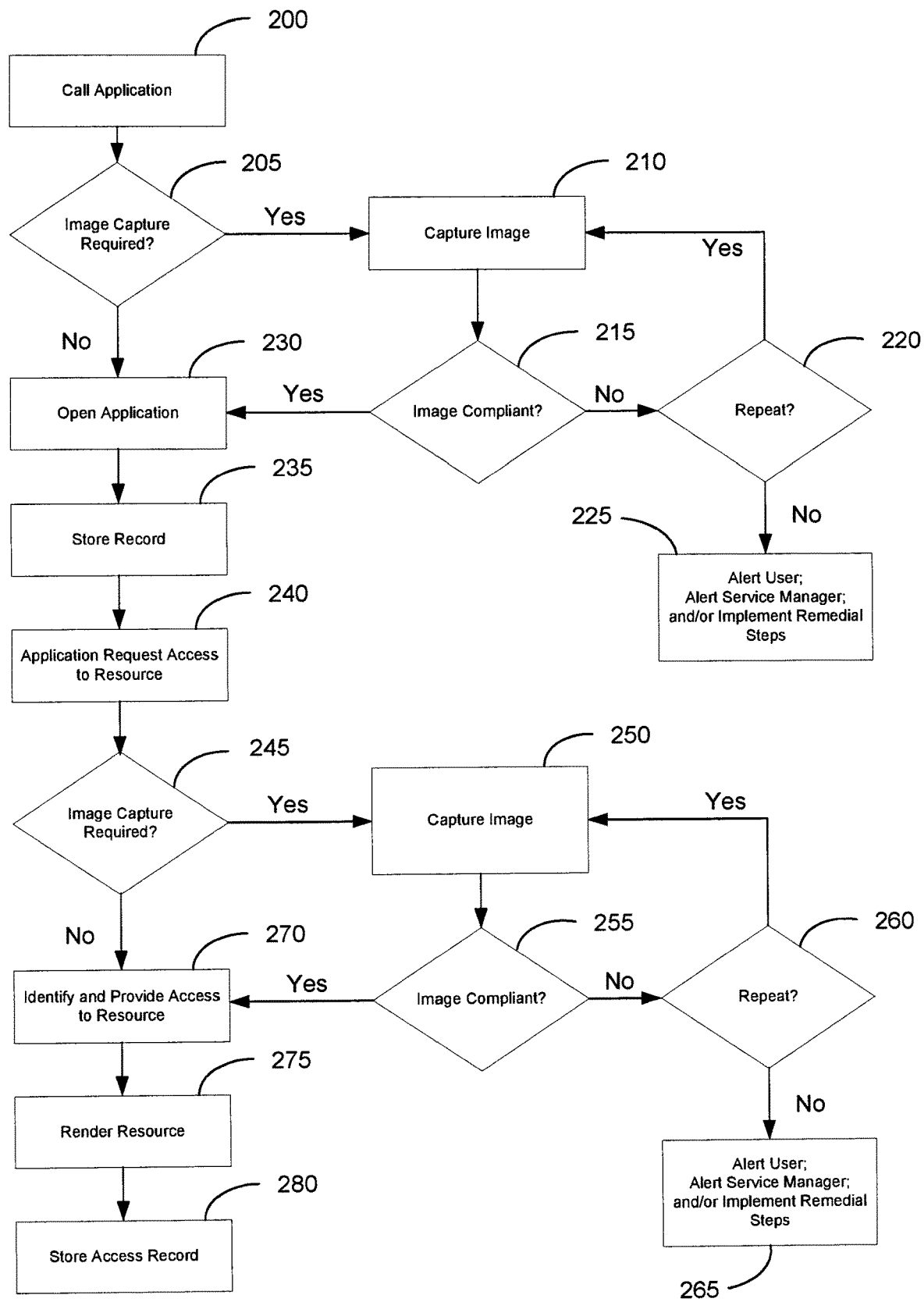
FIG. 2 is a flowchart illustrating an example of an application access control process and image capture in the networked environment of FIG. 1.

FIG. 2 is a flowchart illustrating an example of an application access control and image capture in the networked environment of FIG. 1. As shown in FIG. 2, the method may begin with step 200, in which an application is called on a client device, such as client device 120 from FIG. 1. This may include, for example, a user request to open an application, or to open a file that requires an application that is not currently running. In embodiments where the request to access the resource includes a request to open an application, the application may be referred to as the "called application." In certain embodiments, the request may initiate a limited opening or access to the called application in order to execute instructions that identify whether an image capture is required, as discussed further below. The method may continue with step 205.

In step 205, a determination is made as to whether an image capture is required to open the called application. This determination may be made, for example, based on code included in the called application, by way of profile information set on the device, and/or by controls on a remote server, such as when the called application interacts with a remote server to execute code and/or access resources.

If it is determined that image capture is required, then the method may proceed to step 210. In step 210, instructions are provided to the device OS, or other application, to capture an image using a camera of the device. In some embodiments, it may be preferable to perform some level of validation that the captured image complies with one or more parameters, such as whether the image includes a face or whether a face in the image matches a face from another image. In such cases, the method may proceed from step 210 to step 215, where image compliance is determined. In other cases, the method may proceed from step 210 directly to step 230, where the application is opened, without checking the captured image for compliance.

In optional step 215, compliance of the captured image may be determined according to various factors that may be set, for example, by a service provider that manages the called application, or that provides additional code for the called application to implement the image capture functionality (e.g., code in the form of a wrapper, plugin, or script for the called application or code distributed through an update, service pack or software development kit and added to the called application, etc.). As noted above, such compliance factors may include whether the image includes a face, or whether a face in the image matches a face from another image. Embodiments may also include setting a compliance level by which such parameters are judged, for example to require greater certainty that the image includes a face, or that a face in the image matches a face from another image. Other compliance parameters are also possible including, for example, brightness, contrast or other image attributes by which the quality of the image may be assessed. In some embodiments, different applications on the device may be assigned different parameters and/or compliance levels.

If the image is determined not to comply with the necessary compliance parameters, the method may proceed with step 220. In step 220, a determination may be made as to whether the image capture process should be repeated. This may involve, for example, one or more of providing the user with an option to repeat the process, logging a number of failed attempts and/or comparing the number of failed attempts against a predetermined number of allowable attempts, sending a message to a remote server for a determination as to whether to allow additional attempts, etc. If the determination is made that another image capture is to be attempted, the method may return to step 210 and repeat the image capture process.

If the determination is made that another image capture is not to be attempted, the method may proceed with step 225. In step 225, a number of options are possible. Generally speaking, step 225 may ensure that the request to open the application is denied, at least temporarily, until the problem with the image capture compliance is resolved. This may involve, for example, the client device displaying an alert to the user with, or without, instructions for correcting the problem, the client device sending an alert to the distribution server, the distribution server suspending communication with the client device, the distribution server sending an alert to the client device, with, or without, instructions for correcting the problem, etc.

In some embodiments, the client device 120 and/or distribution server 150 may initiate corrective and/or remedial measures as part of step 225, such as on the client device 120. For example, the user of client device 120 may agree to certain restrictions or remedial measures when the called application is first installed, that go into effect if an image capture check fails. The called application or another client side application 126 may be configured to automatically implement certain corrective and/or remedial measures or to do so in response to a command from the distribution service 174. Such measures may include deleting any local resources that were originally accessed using the image capture function and/or the called application, disabling enterprise resources 165 such as certain enterprise applications requiring image capture, etc. In step 225 an alert may be sent to the user and/or service manager. The alert may include one or more of an identification of the application that did not open, the image capture parameter was noncompliant, user identification, device identification, or other information.

It should be noted that, although only a single image capture step 210 and compliance step 215 are depicted in FIG. 2, as sequentially happening in a certain order, various embodiments are not limited to such operations. For example, image capture and/or compliance may be performed while an application is open, for example, to provide an ongoing video stream, intermittent image capture of a user accessing the application, and/or an image capture when the application is closed. Depending, for example, on a service provider's preferences, this may allow for continuous or intermittent monitoring, and associated storage as discussed further below, while the application is running, and/or when the application is closed.

Returning to step 215, if the image is determined to comply with the necessary compliance parameters, the method may proceed with step 230. In step 230, the called application may be opened. It should be noted that, based on the processing power of current user devices, and the sophistication of automated facial recognition techniques, it may be possible for steps 205, 210, 215 and 230 to happen in substantially real time. That is, when the application is called, the client device may determine that an image capture is required, capture the image, determine image compliance and open the application with little to no discernible lag in presenting the application to the user. This process can be performed even more seamlessly when the Image is not tested for compliance. In such circumstances, the image capture and application opening may be performed substantially contemporaneously, depending on the processing ability of the device. In some embodiments, image capture may be performed when the application is opened, and any necessary image compliance, and/or remedial steps, may be performed after the application is opened.

The method may continue with step 235, in which a record associating the called application and the captured image are stored. The records, or logs, that associate a called application and a captured image may take various forms and may Include different levels of detail. For example, the record may include one or more of a an application identifier, a copy of the captured image, a certificate or other data confirming the access time and date of the called application, a certificate confirming the accuracy and/or capture time of the image copy, a hash identifier of the application and/or image, links to the application and/or image, etc. The record may be stored locally on the device, such as in access records 138 shown in FIG. 1, and/or may be stored on a remote server, such as in access records 172 also shown in FIG. 1.

It should be noted that, in certain embodiments, image compliance step 215 may include a facial recognition check that compares the current captured image with a previously stored image associated with the called application, for example an image copy stored in access records 138 or 172. This may allow, for example, certain sensitive applications to be linked to a particular user via facial recognition such that only that user is allowed to open the application after an initial facial capture links the user's face and the called application.

It should be further noted that similar records may be stored in the event that the image capture compliance fads and the called application is not opened, e.g. in step 225. Such records may be advantageously used, for example, by a service provider to determine whether a particular device is repeatedly attempting to access an application in a noncompliant manner. Such records may be used in determining what, if any, remedial steps are appropriate in step 225, such as remotely disabling an application, remotely wiping applications or data from a device, sending alerts to an enterprise device manager, etc.

The method may proceed with step 240, in which the application requests access to a resource. The resource may include, for example, one or more of another application, a computer folder, a data file, an electronic document, a profile, or other resources described herein. In step 240, a client side application, such as application 126 shown in FIG. 1, requests access to resources which may be stored locally on the device, or remotely on a server, such as distribution server 150 shown in FIG. 1. For example, with respect to a request for remotely stored resources, a client side application 126 may be executed to render a user interface 137 on the display 136 that provides access to the resources 165, e.g. by transmitting request 177 to the distribution server 150.

In step 245, a determination is made as to whether an image capture is required to access the requested resource. This determination may be made, for example, based on a resource identifier, resource group identifiers that apply to the requested resource, distribution rules that apply to the requested resource, code included in the called application, and/or instructions provide by a remote server, such as when the called application interacts with a remote server to access the requested resource. In some embodiments, the server may send the client device an indication that the requested resource requires a facial capture record. This may be included, for example, in a file including the resource, or as a separate communication to the client device, such as a distribution rule 171.

As noted previously, in the context of requesting access to certain local or network data, portions of the requested data, or other associated data, may be accessed for purposes of identifying whether accessing the requested data requires an image capture, and any other confirmation, for rendering, but the requested data may not be fully "accessed" by the user until the image capture and any necessary confirmation are successfully completed. The determination may be further based on user specific, account specific, or device specific information, such that different requirements, and/or compliance levels, may be applied by the system to different users, accounts and/or devices. For example, account administrators or managed devices may be allowed access to applications or other resources without facial capture or with a low-compliance level, whereas lower-level users and/or users of unmanaged devices may be required to satisfy a facial capture parameter with a relatively high compliance level.

If it is determined that image capture is required, then the method may proceed to step 250. In step 250, instructions are provided to the device OS, or other application, to capture an image using a camera of the device. In some embodiments, it may be preferable to perform some level of validation that the captured image complies with one or more parameters, such as whether the image includes a face or whether a face in the image matches a face from another image. In such cases, the method may proceed to step 255, where image compliance is determined. In other cases, the method may proceed directly to step 270, where access to the resource is provided, without checking the captured image for compliance.

In optional step 255, compliance of the captured image may be determined according to various factors and in procedures similar to those described above with respect to step 215. In certain embodiments, the client device may send the captured image, or a copy of the captured image, to the distribution service 174, whether or not a compliance check is required. In such circumstances, the distribution service 174 may be configured to, for example, certify the compliance of the image, and/or to store the copy of the image in association with the resource request or requested resource, as described further herein.

If the image is determined not to comply with the necessary compliance parameters, the method may proceed with step 260. In step 260, a determination is made as to whether the image capture process should be repeated. This may involve, for example, one or more of providing the user with an option to repeat the process, logging a number of failed attempts and/or comparing the number of failed attempts against a predetermined number of allowable attempts, sending a message to a remote server for a determination as to whether to allow additional attempts, etc. If the determination is made that another image capture is to be attempted, the method may return to step 250 and repeat the image capture process.

If the determination is made that another image capture is not to be attempted, the method may proceed with step 265, In step 265, a number of options are possible. Generally speaking, step 225 may ensure that the request to access the resource is denied, at least temporarily, until the problem with the image capture compliance is resolved. This may involve steps similar to those discussed above with respect to step 225. In some embodiments, an alert or notification may be sent from the device to a managing server if a required image capture fails to execute, if it is determined that a required image does not include a face, or any other failure that prohibits access to the requested resource.

In some embodiments, the client device 120 and/or distribution service 174 may initiate corrective and/or remedial measures as part of step 265, such as on the client device 120. For example, the user of client device 120 may agree to certain restrictions or remedial measures when the called application is first installed that go into effect if an image capture check fails. The called client application or another dent side application 126 may be configured to automatically implement certain corrective and/or remedial measures or to do so in response to a command from the distribution service 174. Such measures may include deleting any local resources that were originally accessed using the image capture function and/or the called application, blocking enterprise resources 165 requiring image capture from the device, etc. In step 265 an alert may be sent to the user and/or service manager. The alert may include one or more of an identification of the requested resource, the image capture parameter that was non-compliant, a user identification, a device identification, or other information.

It should be noted that, although only a single image capture step 250 and compliance step 255 are depicted in FIG. 2, as sequentially happening in a certain order, some embodiments are not limited to such operations. For example, image capture and/or compliance may be performed while a resource is open, for example, to provide an ongoing video stream, intermittent image capture of a user accessing the resource, and/or an image capture when the resource is closed. Depending, for example, on a service provider's preferences, this may allow for continuous or intermittent monitoring, and associated storage as discussed further below, while the resource is being rendered to the user, and/or when the resource is closed. In certain embodiments, the image or video capture may be sent to a remote server substantially contemporaneously while the resource is being accessed. In some embodiments, image capture may be performed when the resource is rendered on the client device, and any necessary image compliance, and/or remedial steps, may be performed after the resource is rendered.

Returning to step 255, if the image is determined to comply with the necessary compliance parameters, or if no compliance check is necessary, the method may proceed with step 270. In step 270, all resources corresponding to the requested resource may be identified and access to the identified resources may be provided. As noted previously, access to certain resources may be further restricted by additional protocols that must be satisfied, and may be performed as part of step 270. For example, in addition to satisfying the image capture compliance parameters, a given resource may also require user credentials, device identifiers, profile compliance, compliance with distribution rules 171, or other measures to allow the access in step 270.

In some embodiments, an image capture and/or validation, as described herein, may be all that is implemented in order to grant the application general access to a group of local or remote resources. However, the concepts disclosed herein may also be applied in environments that require various other access controls in addition to, or as alternatives to, the image capture and/or validation, as discussed further below. For example, in certain embodiments, a determination may be made as to whether the requesting application itself complies with the necessary criteria to access the requested resource. This may include, for example, checks to ensure that an application has been updated to a current version, that the request includes valid user credentials, that the request is not coming from a blacklisted address, etc.

Various methods of controlling access and identifying resources that are subject to a particular request may be used. For example, such methods may use resource grouping identifiers 154, which may represent unique identifiers for previously determined resource groupings, and may be used to determine which resources 165 are served up to the user of the client device 120. In some embodiments, the distribution service 174 determines which resources 165 to provide based on the resource grouping identifiers 154 associated with each resource 165. For instance, in the case of a managed client device 120, the distribution service 174 may first determine which resource grouping identifiers 154 are associated with user credentials 132 included in a request 177. In the case of an unmanaged client device, the distribution service 174 may first determine which resource grouping identifiers 154 are associated with profile or certificate information received from the client device 120.

Each resource grouping identifier 154 may be associated with a pairing of at least one of a plurality of approved user credentials and device identifiers 156 and/or a pairing of at least one of a plurality of approved profiles and certificates 159. In some embodiment, the distribution service 174 identifies one or more resources 165 associated with each one of the determined resource grouping identifiers 154. In some embodiments, the distribution service 174 identifies the resource 165 if the resource 165 is associated with all of the determined resource grouping identifiers 154. Additionally or alternatively, in some embodiments, the distribution service 174 identifies the resource 165 if it is associated with a threshold number of the resource grouping identifiers 154, The distribution service 174 may then provide the identified resources 165 to the client device 120 or otherwise allow the client device to access such resources 165.

In some embodiments, each resource 165 may be associated with a listing of approved resource-grouping identifiers 168 and one or more distribution rules 171. The listing of approved resource-grouping identifiers 168 may include at least some of the resource-grouping identifiers 154 that regulate access to the respective resource. The listing of approved resource-grouping identifiers 168 may be predetermined by an administrator entity. For instance, the administrator entity may specify which of the resource-grouping identifiers 168 may be used to access to a respective one or more of the resources 165. Additionally or alternatively, distribution rues 171 may regulate how an entity having a combination of approved user credentials and device identifier may access the respective resource 165. For example, in some embodiments, the distribution rues 171 may describe a required and/or a permitted state that an accessing client device 120 may satisfy in order for the client device 120 to be permitted access to the resource 165. Non-limiting examples of distribution rules 171 may include (but are not) limited to hardware requirements, software requirements, configuration requirements, maintenance requirements of a computing device, and/or requirements related to the resource 165.

In certain embodiments, the distribution service 174 may facilitate accessing the resources 165 for the client device 120. In some embodiments, the requested resource(s) may be provided to client side application 126 based on receiving the request, a compliant associated image, and any other necessary validation without further input from the user, e.g. the distribution service 174 automatically transmits the identified resources 165 that the client device 120 is authorized to receive. In some embodiments, the distribution service 174 may provide an operable hyperlink, or the like, to the client device 120, that is tied to a specific client side application. For instance, the client device 120 may receive an indication that the resource 165 is available for download and may transmit a request to the distribution service 174 for downloading the applicable resource 165. Upon receiving the request, the distribution service 165 may transmit the resource 165 to the client device 120.

Other access facilitating methods may include, for example, granting folder access, application downloads and/or access, etc. For example, the distribution service 174 may provide an appropriate user interface to the client device 120. The distribution service 174 may determine the resource grouping identifiers 154 of the resources 165 accessible using the profile 123 from the client device 120. In some embodiments, the distribution service 174 determines the resource grouping identifiers 154 based on the required certificate. For instance, each resource grouping identifier 154 may be associated with a profile/certificate. The distribution service 174 may determine one or more resource grouping identifiers 154 associated with the profile/certificate, as described above.

The method may continue with step 275 in which the resource is rendered on the client device, for example, on the display 136 of the client device 120. In some embodiments, the resources 165 may be presented in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120.

In some embodiments, image and/or video capture may continue while the resource is being rendered. For example, still images may be captured intermittently or a video stream may be saved in access records 138 or 172, and/or streamed or otherwise transmitted to remote server 150. If mandated, compliance checks may be performed on some or all of such intermittent images or video stream. In such embodiments, rendering of the resource may be suspended if any of the images or video stream fans the compliance check, and the method may proceed, essentially as with step 260, to allow repeated image capture and compliance steps, or to terminate the application and/or send alerts as in step 265.

The method may continue with step 235, in which a record associating the called application and the captured image are stored. The records, or logs, that associate the resource provided to the client device and a captured image may take various forms and may include different levels of detail. For example, the record may include one or more of a resource identifier, a resource version number, an application identifier, a copy of the captured image, a certificate or other data confirming the access time and date of the resource, a certificate or other data confirming the resource having been rendered by the specific device, a certificate confirming the accuracy and/or capture time of the image copy, a hash identifier of the resource and/or image, links to the resource and/or image, etc. The record may be stored locally on the device, such as in access records 138 shown in FIG. 1, and/or may be stored on a remote server, such as in access records 172 also shown in FIG. 1.

It should be noted that, in certain embodiments, image compliance step 255 may include a facial recognition check that compares the current captured image or video frames with a previously stored image associated with the requested resource, preferably a resource 135 stored on the client device 120. This may allow, for example, certain sensitive resources to be linked to a particular user via facial recognition such that only that user is allowed to open the resource on the device after an initial facial capture links the user's face and the resource.

It should be further noted that similar records may be stored in the event that the image capture compliance fails and the called application is not opened, e.g. in step 265. Such records may be advantageously used, for example, by a service provider to determine whether a particular device is repeatedly attempting to access a resource in a non-compliant manner. Such records may be used in determining what, if any, remedial steps are appropriate in step 265, such as remotely disabling an application, remotely wiping applications or other resources from a device, sending alerts to an enterprise device manager, etc.

It should be appreciated that in some embodiments, the facial capture process described herein may be used in connection with attempts to open a called application on a client device 120 but not in connection with subsequent attempts by the called application to access resources. In such cases, the facial capture process may involve only steps 200 through 235 as shown and described with respect to FIG. 2. In some embodiments the facial capture process described herein may be used in connection with attempts by a called application to access resources, but not in connection with attempts to open the called application. In such cases, the facial capture process may involve only steps 240 through 280 as shown and described with respect to FIG. 2.

Although the distribution service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 may show certain functionality and operations described as performed by the distribution service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may, represent a circuit or a number of interconnected circuits to implement the specified logical function(s).

Although the flowchart of FIG. 2 shows a specific order of execution, it is understood that the order of execution may differ from that which is depicted. For example, the order of execution of two or more steps may be scrambled relative to the order shown. Also, two or more blocks shown in succession in PG. 2 may be executed concurrently or with partial concurrence. Further, in some embodiments, one or more of the steps shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. R is understood that all such variations are within the scope of the present disclosure.

Any logic or application described herein, including the distribution service 174 and the client side application 126, or other processes and modules running on distribution server 150 or client device 120, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

As used herein, a "profile" should be understood as referring to a file that is recognizable by the operating system (OS) of a user device, that defines one or more device parameters, typically set by a service manager such as an MDM, and that may include an embedded certificate that the OS will recognize and install for the device, such as in a "trust store" or "certificate store" or other suitable memory space (any of which may be generically herein as a "trust store" for ease of reference) of the device. Typically, the profile is formatted in a manner such that the particular OS is able to recognize and implement the settings defined therein when installed by a user. For example, a profile may be an XML file that contains settings (also referred to as parameters) to deploy to the OS of a client device. The parameters may set and/or control a variety of device settings, functions and the like, e.g. passcode policies, email account configurations, calendar, contact accounts, VPN settings, WiFi settings, restrictions on how and what features and components of the device can and cannot be used, etc. If the profile is uninstalled, disabled, becomes corrupted or is otherwise inactive, the OS will remove the corresponding certificate from its trust store.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for blocking access to an application on a mobile computing device, comprising:
   receiving a request to open the application;
   determining, based on the request, whether the application requires execution of a facial recognition algorithm prior to opening the application;
   executing the facial recognition algorithm to authorize the user to access the application;
   storing a record that includes a certificate reflecting the authorization of the user to access the application;
   after authorizing the user, executing the facial recognition algorithm to perform a subsequent authorization;
   determining that the user fails the subsequent authorization; and
   revoking the certificate.

2. The method of claim 1, further comprising terminating the application.

3. The method of claim 1, wherein, during execution of the facial recognition algorithm, the application is opened with limited functionality until the facial recognition algorithm successfully authenticates the user.

4. The method of claim 1, further comprising transmitting, to a remote server, a record reflecting the failed subsequent authorization.

5. The method of claim 1, further comprising logging a number of failed attempts to authorize a user with the facial recognition algorithm.

6. The method of claim 1, further comprising deleting the stored record based on the failed subsequent authorization.

7. The method of claim 1, further comprising:
receiving a profile from a remote management system including a list of applications that require execution of the facial recognition algorithm,
wherein determining whether the application requires execution of a facial recognition comprises comparing an identifier of the application being opened with the list of applications included in the profile.

8. A non-transitory, computer-readable medium comprising instruction which, when executed by a processor, blocks access to an application on a mobile computing device by performing stages for:
receiving a request to open the application;
determining, based on the request, whether the application requires execution of a facial recognition algorithm prior to opening the application;
executing the facial recognition algorithm to authorize the user to access the application;
storing a record that includes a certificate reflecting the authorization of the user to access the application;
after authorizing the user, executing the facial recognition algorithm to perform a subsequent authorization; and
if the user fails the subsequent authorization, revoking the certificate reflecting the authorization of the user to access the application.

9. The non-transitory, computer-readable medium of claim 8, the stages further comprising terminating the application.

10. The non-transitory, computer-readable medium of claim 8, wherein, during execution of the facial recognition algorithm, the application is opened with limited functionality until the facial recognition algorithm successfully authenticates the user.

11. The non-transitory, computer-readable medium of claim 8, the stages further comprising transmitting, to a remote server, a record reflecting the failed subsequent authorization.

12. The non-transitory, computer-readable medium of claim 8, the stages further comprising logging a number of failed attempts to authorize a user with the facial recognition algorithm.

13. The non-transitory, computer-readable medium of claim 8, the stages further comprising deleting the stored record based on the failed subsequent authorization.

14. The non-transitory, computer-readable medium of claim 8, the stages further comprising:
receiving a profile from a remote management system including a list of applications that require execution of the facial recognition algorithm,
wherein determining whether the application requires execution of a facial recognition comprises comparing an identifier of the application being opened with the list of applications included in the profile.

15. A system for blocking access to an application on a mobile computing device, comprising:
a mobile computing device comprising a processor and a memory, the processor and the memory being configured to:
receive a request to open the application;
determine, based on the request, whether the application requires execution of a facial recognition algorithm prior to opening the application;
execute the facial recognition algorithm to authorize the user to access the application;
store a record that includes a certificate reflecting the authorization of the user to access the application;
after authorizing the user, execute the facial recognition algorithm to perform a subsequent authorization; and
if the user fails the subsequent authorization, revoke the certificate reflecting the authorization of the user to access the application.

16. The system of claim 15, further comprising terminating the application.

17. The system of claim 15, wherein, during execution of the facial recognition algorithm, the mobile computing device opens the application with limited functionality until the facial recognition algorithm successfully authenticates the user.

18. The system of claim 15, further comprising transmitting, to a remote server, a record reflecting the failed subsequent authorization.

19. The system of claim 15, further comprising logging a number of failed attempts to authorize a user with the facial recognition algorithm.

20. The system of claim 15, further comprising deleting the stored record based on the failed subsequent authorization.

* * * * *